United States Patent
Burrell et al.

(10) Patent No.: US 10,286,779 B2
(45) Date of Patent: May 14, 2019

(54) POWER TAKE-OFF UNIT WITH ATTACHED PNEUMATIC VALVE

(71) Applicant: Parker-Hannifin Corporation, Cleveland, OH (US)

(72) Inventors: John William Burrell, Olive Branch, MS (US); Gregory Friend, Collierville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 33 days.

(21) Appl. No.: 15/523,957

(22) PCT Filed: Jan. 6, 2016

(86) PCT No.: PCT/US2016/012288
§ 371 (c)(1),
(2) Date: May 3, 2017

(87) PCT Pub. No.: WO2016/112074
PCT Pub. Date: Jul. 14, 2016

(65) Prior Publication Data
US 2017/0361705 A1    Dec. 21, 2017

Related U.S. Application Data

(60) Provisional application No. 62/100,147, filed on Jan. 6, 2015.

(51) Int. Cl.
*B60K 17/02* (2006.01)
*B60K 17/28* (2006.01)

(52) U.S. Cl.
CPC .............. *B60K 17/28* (2013.01); *B60K 17/02* (2013.01); *B60Y 2300/423* (2013.01)

(58) Field of Classification Search
CPC ... B60K 17/28; B60K 17/02; B60Y 2300/423
See application file for complete search history.

(56) References Cited

U.S. PATENT DOCUMENTS

| 5,237,883 A | 8/1993 | Churchill et al. |
| 5,542,306 A | 8/1996 | Fernandez |

(Continued)

FOREIGN PATENT DOCUMENTS

| EP | 1510394 A1 | 3/2005 |
| WO | 2007108805 A1 | 9/2007 |

OTHER PUBLICATIONS

PCT International Search Report, Application No. PCT/US2016/012288 filed Jan. 6, 2016, dated Apr. 25, 2016.

(Continued)

*Primary Examiner* — Drew J Brown
(74) *Attorney, Agent, or Firm* — MacMillan, Sobanski & Todd, LLC

(57) ABSTRACT

A power take-off unit includes a housing, an input mechanism mounted at least partially within the housing and configured for attachment to a source of rotational energy, and an output mechanism is configured for attachment to a driven accessory. The power take-off unit also includes a clutch assembly configured to selectively connect the output mechanism to the input mechanism. A pneumatic valve manifold is attached to the housing and is configured to provide pressurized air to the clutch assembly.

16 Claims, 12 Drawing Sheets

(56) References Cited

U.S. PATENT DOCUMENTS

| | | | | |
|---|---|---|---|---|
| 6,073,502 A * | 6/2000 | Wallace | ............... | B60K 17/28 |
| | | | | 192/69.9 |
| 6,151,975 A | 11/2000 | Kirkpatrick et al. | | |
| 8,127,632 B2 | 3/2012 | Buhrke | | |
| 8,783,124 B2 * | 7/2014 | Rang | ............... | B60K 25/06 |
| | | | | 74/11 |
| 9,579,976 B2 * | 2/2017 | Horsfall | ............... | B60K 17/28 |
| 2005/0045446 A1 * | 3/2005 | Fernandez | ............ | B60K 17/28 |
| | | | | 192/109 R |
| 2010/0099533 A1 | 4/2010 | Horsfall et al. | | |
| 2011/0259450 A1 | 10/2011 | Mussoi et al. | | |
| 2013/0008700 A1 | 1/2013 | Osuga et al. | | |
| 2013/0098180 A1 * | 4/2013 | Erhard | ............... | B60K 17/28 |
| | | | | 74/15.82 |
| 2015/0135863 A1 * | 5/2015 | Dalum | ............... | B60K 25/00 |
| | | | | 74/11 |
| 2016/0129786 A1 * | 5/2016 | Petersen | ............ | B60K 17/28 |
| | | | | 74/11 |
| 2017/0167543 A1 * | 6/2017 | Rinkenbaugh | ......... | B60K 25/00 |

OTHER PUBLICATIONS

Extended European Search Report, Application No. 16735338.2, dated Jan. 4, 2019.

* cited by examiner

POWER TAKE-OFF UNIT WITH ATTACHED PNEUMATIC VALVE

CROSS-REFERENCE TO RELATED APPLICATIONS

This application claims the benefit of U.S. Provisional Application No. 62/100,147, filed Jan. 6, 2015, the disclosure of which is incorporated herein by reference.

BACKGROUND OF THE INVENTION

This invention relates in general to power take-off units for selectively providing rotational energy from a source of rotational energy to a driven accessory. In particular, this invention relates to an improved structure for a power take-off unit that includes an attached pneumatic valve.

A power take-off unit is a well known mechanical device that is often used in conjunction with a source of rotational energy, such as a vehicle engine or transmission, to provide rotational energy to a driven accessory. For example, power take-off units are commonly used in industrial and agricultural vehicles to provide rotational energy to hydraulic pumps that, in turn, are used to operate hydraulically driven accessories such as plows, trash compactors, lifting mechanisms, winches, and the like. The power take-off unit provides a simple, inexpensive, and convenient means for supplying energy from the source of rotational energy to the hydraulic pump that, in turn, provides relatively high pressure fluid to operate the driven accessory.

A typical power take-off unit includes an input mechanism and an output mechanism. The input mechanism of the power take-off unit is adapted to be connected to the source of rotational energy so as to be rotatably driven whenever the source of rotational energy is operated. The output mechanism of the power take-off unit is adapted to be connected to driven equipment, such as the hydraulic pump, or any other device that requires rotational torque and speed. In some instances, the input mechanism of the power take-off unit is selectively connected to the output mechanism, for example via an input cluster gear meshed with the output gear, such that the hydraulic pump is rotatably driven whenever the source of rotational energy is operated. In other instances, a clutch assembly is provided between the input mechanism and the output mechanism such that the hydraulic pump is selectively driven only when the source of rotational energy is operated and the clutch assembly is engaged.

A typical hydraulic pump includes a fluid inlet port, a fluid outlet port, and a pumping mechanism. The fluid inlet port is adapted to communicate with a reservoir containing a quantity of relatively low pressure hydraulic fluid, while the fluid outlet port is adapted to communicate with the hydraulically driven device. The pumping mechanism of the hydraulic pump is adapted to be connected to the output mechanism of the power take-off unit so as to be rotatably driven whenever the power take-off unit is operated. Thus, when the power take-off unit is operated, the hydraulic pump draws relatively low pressure hydraulic fluid from the reservoir and supplies a flow of relatively high pressure hydraulic fluid to the hydraulically driven device.

The components of the power take-off unit are typically supported within a housing that is closed to retain lubricant and to prevent the entry of dirt, water, and other contaminants therein. In many instances, the power take-off unit housing is formed from first and second power take-off unit housing portions that are separate from one another, but are secured together to form a sealed enclosure for the components of the power take-off unit. For example, the first power take-off unit housing portion may be generally hollow in shape, having an opened end and a closed end, while the second power take-off unit housing portion may be generally flat and circular. The second power take-off unit housing portion can be secured to the first power take-off unit housing portion so as to close the opened end thereof and thereby form the power take-off unit housing. Such a two-piece structure facilitates the assembly and servicing of the components of the power take-off unit, and further allows either or both of the input and output mechanisms of the power take-off unit to be rotatably supported on the closed end of the first power take-off unit housing portion and the second power take-off unit housing portion.

In many instances, the power take-off unit further includes a clutch assembly for selectively disconnecting the output shaft from the input gear. The use of a clutch assembly in a power take-off unit is desirable because it permits selective or intermittent operation of the driven accessory without having to park the vehicle and stop the transmission gears from spinning. When the clutch assembly is engaged, the output shaft is rotatably driven by the input gear. Consequently, the driven device is operated by the vehicle engine. Conversely, when the clutch assembly is disengaged, the output shaft is not rotatably driven by the input gear. As a result, the driven device is not operated by the vehicle engine.

Typically, the clutch assembly is engaged by pressurized fluid from a transmission oil pump. Alternatively, in a truck having a transmission that does not include an attached oil pump for example, a source of pressurized air may be provided from a truck's air brakes through a pneumatic valve located remotely from the power take-off unit at a location near the source of pressurized air or between the air brakes and the power take-off unit.

Although the installation and assembly of the pneumatic valve and associated pneumatic lines in a vehicle in this manner has been satisfactory, the need has arisen to reduce the overall number and size of parts required to deliver pressurized air to the clutch assembly in a power take-off unit. Thus, it would be desirable to provide an improved structure for a power take-off unit that includes a pneumatic valve having a reduced size and number of parts, and is attached to the power take-off unit.

SUMMARY OF THE INVENTION

This invention relates to an improved structure for a power take-off unit that includes an attached pneumatic valve. The improved power take-off unit includes a housing, an input mechanism mounted at least partially within the housing and configured for attachment to a source of rotational energy, and an output mechanism configured for attachment to a driven accessory. The power take-off unit also includes a clutch assembly configured to selectively connect the output mechanism to the input mechanism. A pneumatic valve manifold is attached to the housing and is configured to provide pressurized air to the clutch assembly.

Other advantages of the invention will become apparent to those skilled in the art from the following detailed description, when read in view of the accompanying drawings.

DETAILED DESCRIPTION OF THE INVENTION

Figure 1:
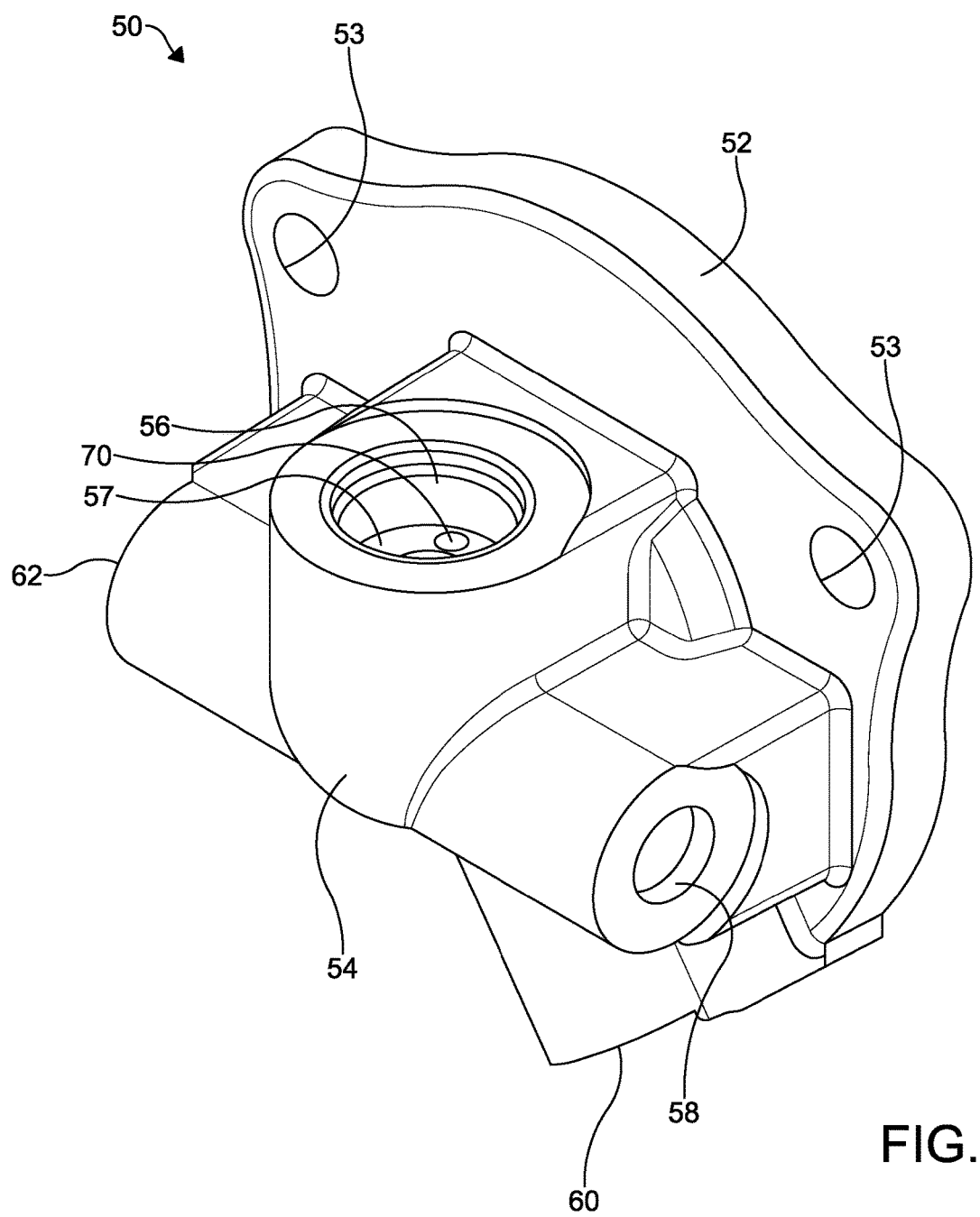
FIG. 1 is a perspective view of a first embodiment of an improved pneumatic valve manifold according to this invention.

Referring now to the drawings, there is illustrated in FIGS. 1 through 6 a first embodiment of a pneumatic valve manifold 50 according to this invention. The pneumatic valve manifold 50 is configured for attachment to a power take-off unit, such as the power take-off unit 10, illustrated in FIGS. 7 through 9 and described in detail below. The pneumatic valve manifold 50 includes a mounting flange 52 having a plurality of fastener apertures 53 formed therethrough, and a manifold body 54. The manifold body 54 includes a plurality of ports formed therein. In the illustrated embodiment, the manifold body 54 includes a first or pneumatic valve connection port 56, a second or pressure switch port 58, a third or lubrication port 60, and a fourth or air intake port 62.

The pneumatic valve connection port 56 is configured to receive a pneumatic valve 80, described in detail below. The illustrated pneumatic valve connection port 56 is further configured as a substantially cylindrical stepped bore having a first diameter portion 57a and a second diameter portion 57b inboard of, and smaller than, the first diameter portion 57a. A step 57 is defined between the first diameter portion 57a and the second diameter portion 57b. The pneumatic valve 80 may be connected within the pneumatic valve connection port 56 by a threaded connection. Alternatively, the pneumatic valve 80 may be connected within the pneumatic valve connection port 56 by any other desired means of connection, such as by welding.

The pressure switch port 58 is configured to receive a pressure switch (not shown), such as an electrical pressure switch operative to sense a change in air pressure in the pneumatic valve manifold 50 that indicates that the power take-off unit 10 is operating. The electrical pressure switch may then send a signal to the vehicle operator, such as for example a visible or audible signal in the vehicle cab. The pressure switch may be connected within the pressure switch port 58 by a threaded connection. Alternatively, the pressure switch may be connected within the pressure switch port 58 by any other desired means of connection, such as by welding.

The lubrication port 60 is configured to receive a fluid conduit (not shown) that carries fluid from a source of fluid, such as transmission oil from the vehicle transmission for lubricating and/or cooling the power take-off unit 10. The fluid conduit may include a threaded fitting (not shown) and may be connected within the lubrication port 60 by a threaded connection. Alternatively, the fluid conduit may be connected within the lubrication port 60 by any other desired means of connection, such as by welding.

Figure 4:
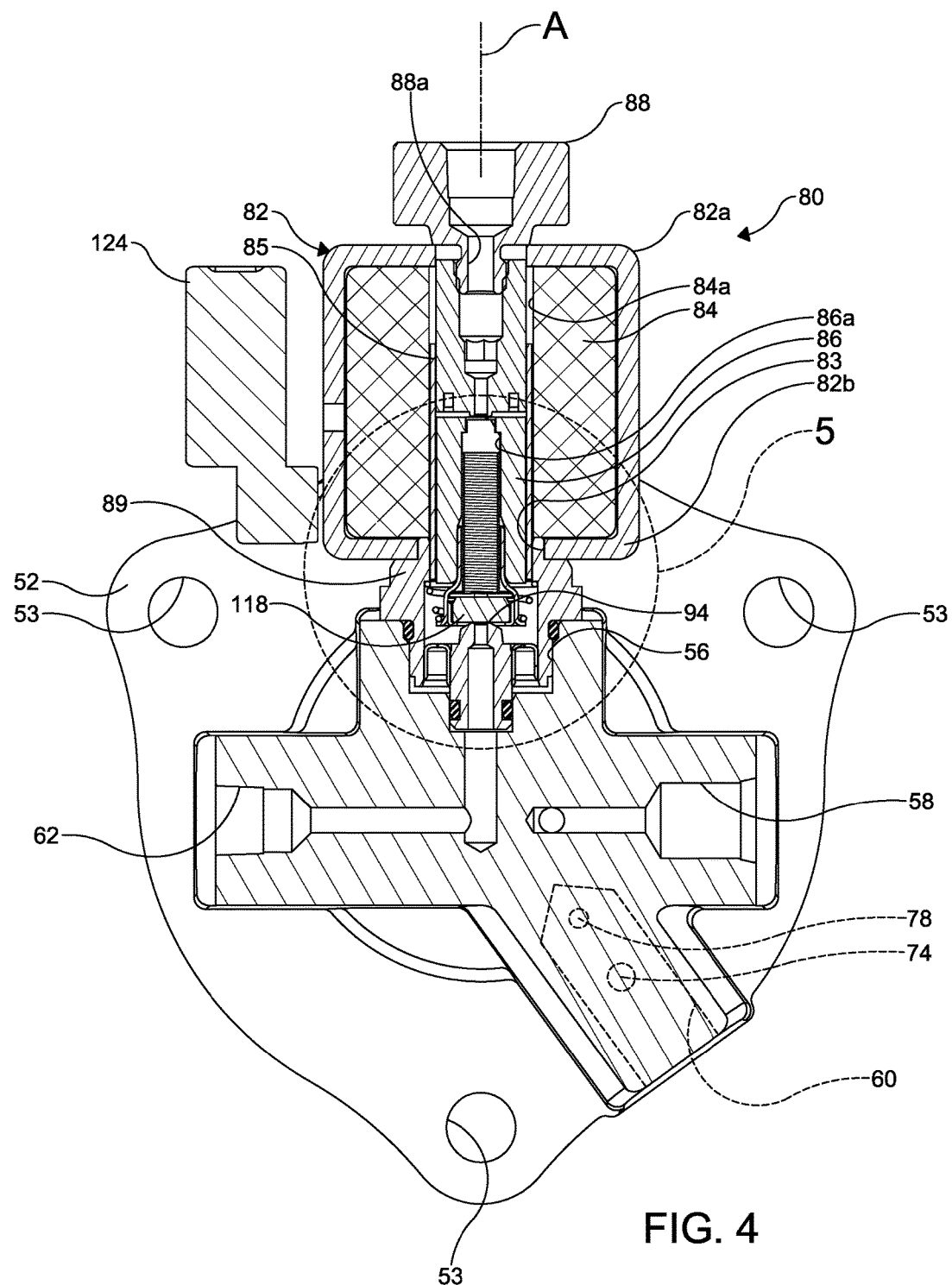
FIG. 4 is a sectional view taken along the line 4-4 of FIG. 3.

The air intake port 62 is configured to receive an air conduit (not shown) that carries pressurized air from a source of pressurized air. In a truck for example, the source of pressurized air may be the air brakes. As best shown in FIG. 4, the air intake port 62 is in fluid communication with the pneumatic valve connection port 56. The air conduit may include a threaded fitting (not shown) and may be connected within the air intake port 62 by a threaded connection. Alternatively, the air conduit may be connected within the air intake port 62 by any other desired means of connection, such as by welding.

If desired, a pressure protection valve (not shown) may be provided between the source of pressurized air and the pressure switch. The pressure protection valve may be a conventional pressure protection valve. Conventional pressure protection valves may be used to isolate an auxiliary air system, such as the power take-off unit 10, from the vehicle air brake system. This may be done to preserve air for braking in the event that the auxiliary system develops a major leak.

Figure 3:
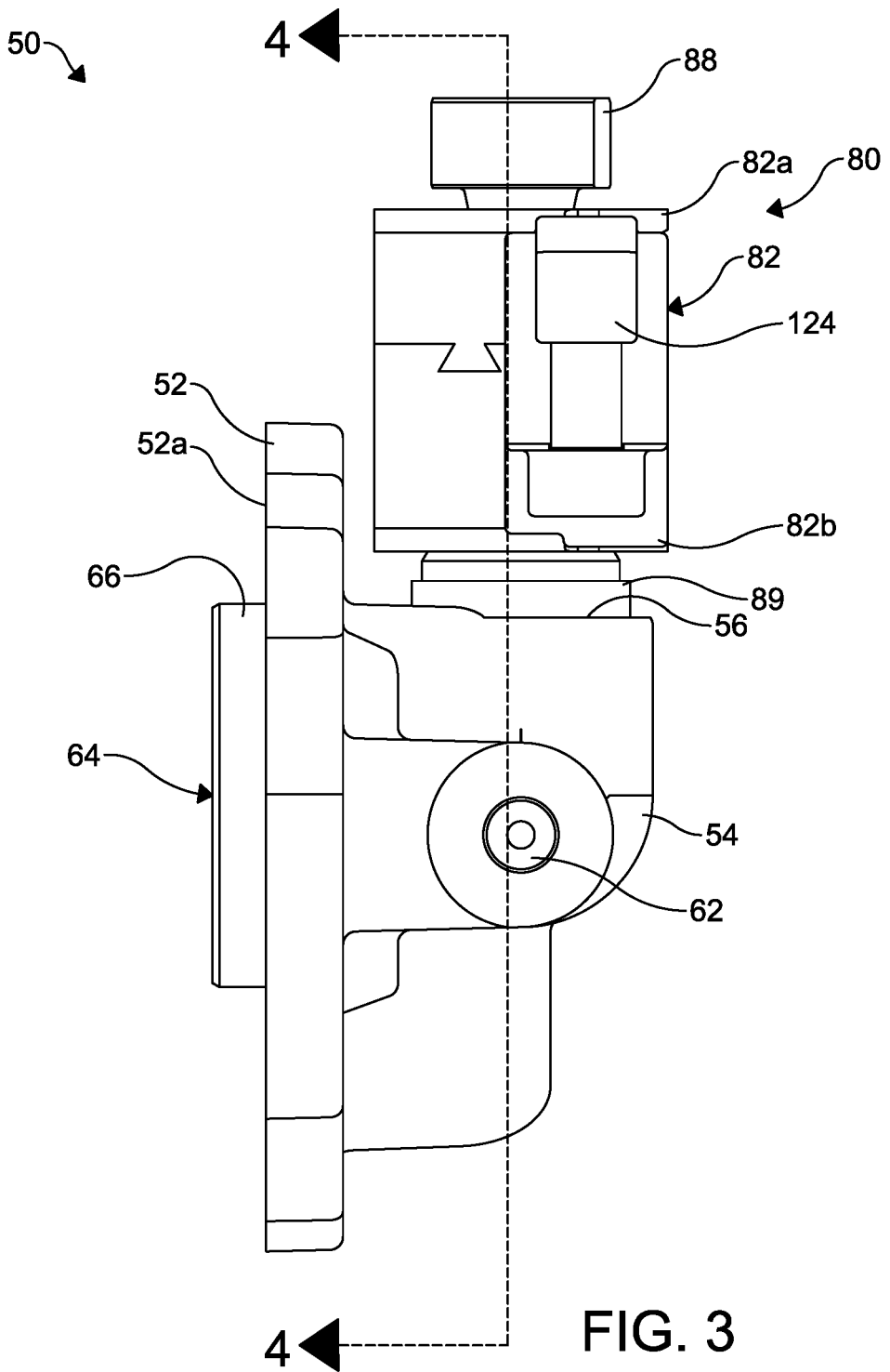
FIG. 3 is a side elevational view of the pneumatic valve manifold and the pneumatic valve illustrated in FIG. 2.
Figure 6:
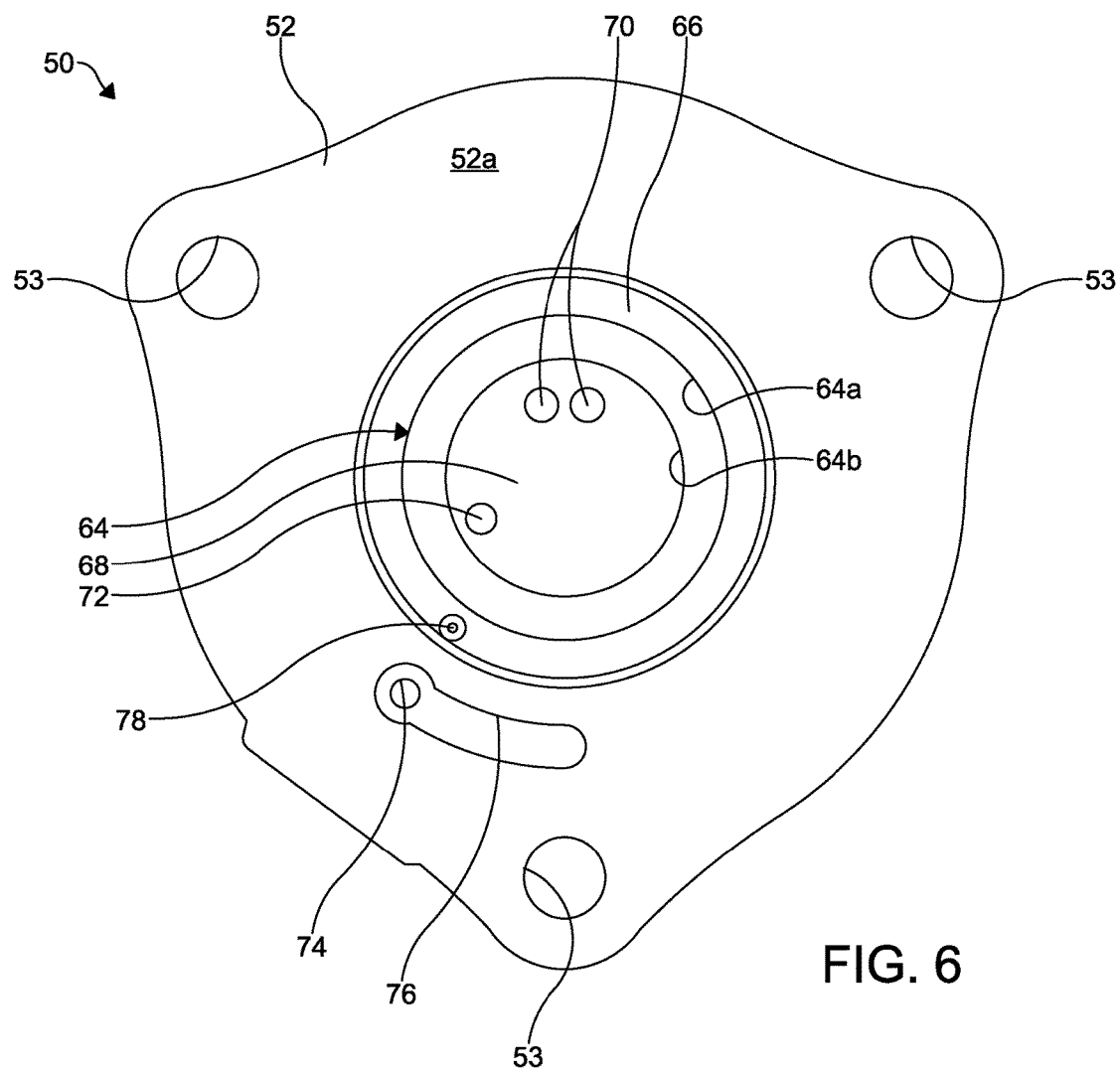
FIG. 6 is a bottom plan view of the pneumatic valve manifold illustrated in FIGS. 1 through 5.

As best shown in FIGS. 3 and 6, the pneumatic valve manifold 50 includes a substantially flat reverse side 52a having a plurality of air and/or fluid passageways formed therethrough. The reverse side 52a includes a centrally formed and substantially cylindrical stepped cavity 64 surrounded by an outwardly extending annular wall 66. The stepped cavity 64 includes a first diameter portion 64a, a second diameter portion 64b inboard of, and smaller than, the first diameter portion 64a, and an end or bottom wall 68.

A pair of discharge passageways 70 extends between the step 57 and the bottom wall 68 and transmits air from the pneumatic valve connection port 56 to a clutch assembly 14 of the power take-off unit 10. A pressure switch passageway 72 is also formed in the bottom wall 68 and extends between the pressure switch port 58 and the bottom wall 68. The pressure switch passageway 72 transmits pressurized air from the power take-off unit 10 to the pressure switch (not shown) in the pressure switch port 58.

A first lubrication passageway 74 is formed in an arcuate groove 76 formed between the annular wall 66 and an outboard edge of the pneumatic valve manifold 50. The first lubrication passageway 74 extends between the lubrication port 60 and the bottom wall 68 and transmits fluid, such as transmission oil, to bearings, such as roller bearings 15a and 15b. of the power take-off unit 10 shown in FIG. 8. A second lubrication passageway 78 is formed in the annular wall 66 between the lubrication port 60 and the annular wall 66, and transmits fluid, such as transmission oil, to bearings, such as needle bearings 17 of the power take-off unit 10 shown in FIG. 8.

Figure 8:
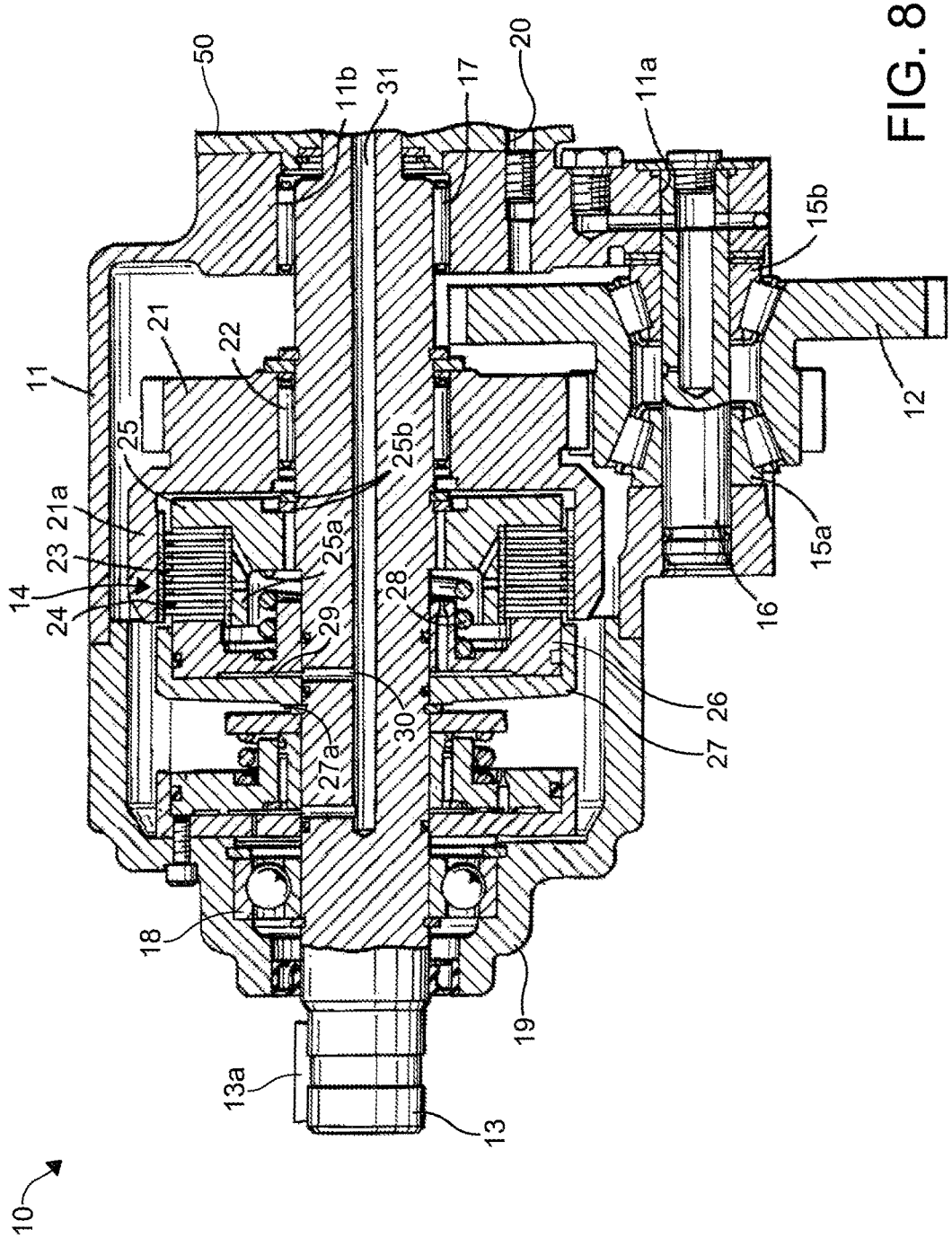
FIG. 8 is a sectional elevational view of the power take-off unit illustrated in FIG. 7 showing a portion of the first embodiment of the pneumatic valve manifold illustrated in FIG. 1 attached thereto.

As shown in FIG. 8, the reverse side 52A of the pneumatic valve manifold 50 may be mounted to an outside surface of the power take-off unit 10, such that the cavity 64 is mounted about an output shaft 13, described in detail below, of the power take-off unit 10. The pneumatic valve manifold 50 is thus in fluid communication with the clutch assembly 14 of the power take-off unit 10 via a passageway 31, also described in detail below.

The pneumatic valve manifold 50 may be formed from any desired material, such as aluminum. Alternatively, the pneumatic valve manifold 50 may be from cast iron, other metals, metal alloys, non-metals, and composite materials.

Figure 2:
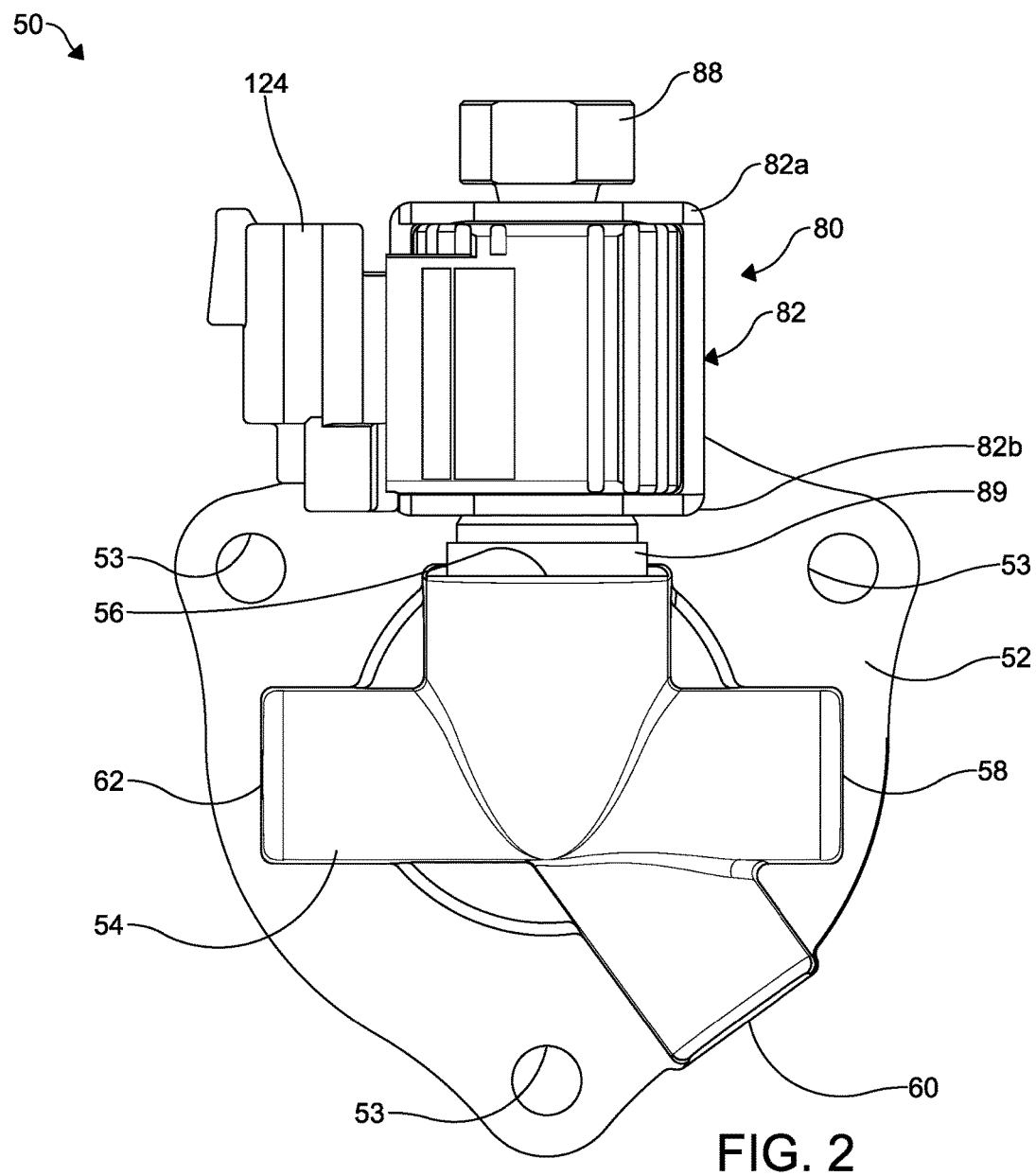
FIG. 2 is a top plan view of the pneumatic valve manifold illustrated in FIG. 1 with a pneumatic valve attached thereto.

As best shown in FIGS. 2 and 3, the pneumatic valve 80 is configured to control the flow of pressurized air from the source of pressurized air to the clutch assembly 14, and includes a valve housing 82 having a first end 82a and a second end 82b. In the embodiment illustrated, the pneumatic valve 80 is a solenoid valve having an electric coil 84, such as a 12V or a 24V coil, mounted within the valve housing 82. A cylindrical sleeve 85 is mounted within an axially extending bore 84a defined by the coil 84. An axially movable armature 86 is slidably mounted within the sleeve 85. An exhaust valve port member 88 includes an axially extending exhaust bore 88a and is mounted in the bore 84a at the first end 82a of the housing 82. The bore 88a defines an annular exhaust valve seat 88b at an inboard end thereof (the lower end when viewing FIGS. 4 and 5).

A threaded connecting member 89 includes an axially extending bore 89a and extends between a centrally formed opening 83 in the second end 82b of the housing 82 and the pneumatic valve connection port 56. The bore 89a also defines an air chamber 89b.

Although the connecting member 89 is described as being connected to the pneumatic valve connection port 56 by a threaded connection, it may be connected to the pneumatic valve connection port 56 by any other suitable means, such as by welding.

The armature 86 is substantially cylindrical and includes an axially extending bore 86a and a plurality of axially extending grooves 86b formed in an outside surface thereof. A transverse groove 86c may be formed in an end surface of the armature 86. A cap 87 is seated against a step formed in a first end 86a1 of the bore 86a, and further defines a valve closure member for the exhaust valve seat 88b of the exhaust valve port member 88.

An inlet valve seat member 90 includes an axially extending bore 92. The bore 92 defines an annular inlet valve seat 94 at a first end 92a thereof. The inlet valve seat member 90 is mounted within the second diameter portion 57b of the pneumatic valve connection port 56.

An outlet valve port member 96 includes concentric cylindrical inner and outer walls 98a and 98b, respectively joined by an end wall 100. The end wall 100 includes a plurality of fluid flow holes 102. The outlet valve port member 96 is mounted within the bore 89a of the threaded connecting member 89. An annular space between the inner wall 98a, the outer wall 98b, and the end wall 100 defines an outlet valve passageway 104. The inlet valve seat member 90 is mounted within the cylindrical inner wall 98a.

A spring cage 106 includes a first end 106a having a first diameter and a second end 106b having a second diameter larger than the first diameter. A disk shaped spring retainer 108 includes a centrally formed fluid passageway 110 and is mounted within the second end 106b transversely to an axis A of the spring retainer 108. The first end 106a extends into and is mounted within a second end 86a2 of the bore 86a of the armature 86. The second end 106b includes a radially outwardly extending flange 112.

A cup shaped cap 114 includes a fluid passageway 116 formed in an end wall thereof and is mounted within the second end 106b of the spring cage 106. The cap 114 retains a valve closure member 118 within the spring cage 106 between the spring retainer 108 and the cup shaped cap 114.

A first fluid seal 120, such as an O-ring, may be provided in an annular groove formed in an outside surface of the valve seat member 90 to provide a fluid seal between the valve seat member 90 and the second diameter portion 57b of the pneumatic valve connection port 56. Similarly, a second fluid seal 122, such as an O-ring, may be provided in an annular groove formed in an outside surface of the connecting member 89 to provide a fluid seal between the connecting member 89 and the first diameter portion 57a of the pneumatic valve connection port 56.

A first spring 124 extends between the cap 87 and the spring retainer 108 within the bore 86a of the armature 86. A second spring 126 extends between a shoulder formed in the bore 89a of the connecting member 89 and the flange 112 of the spring cage 106.

Figure 5:
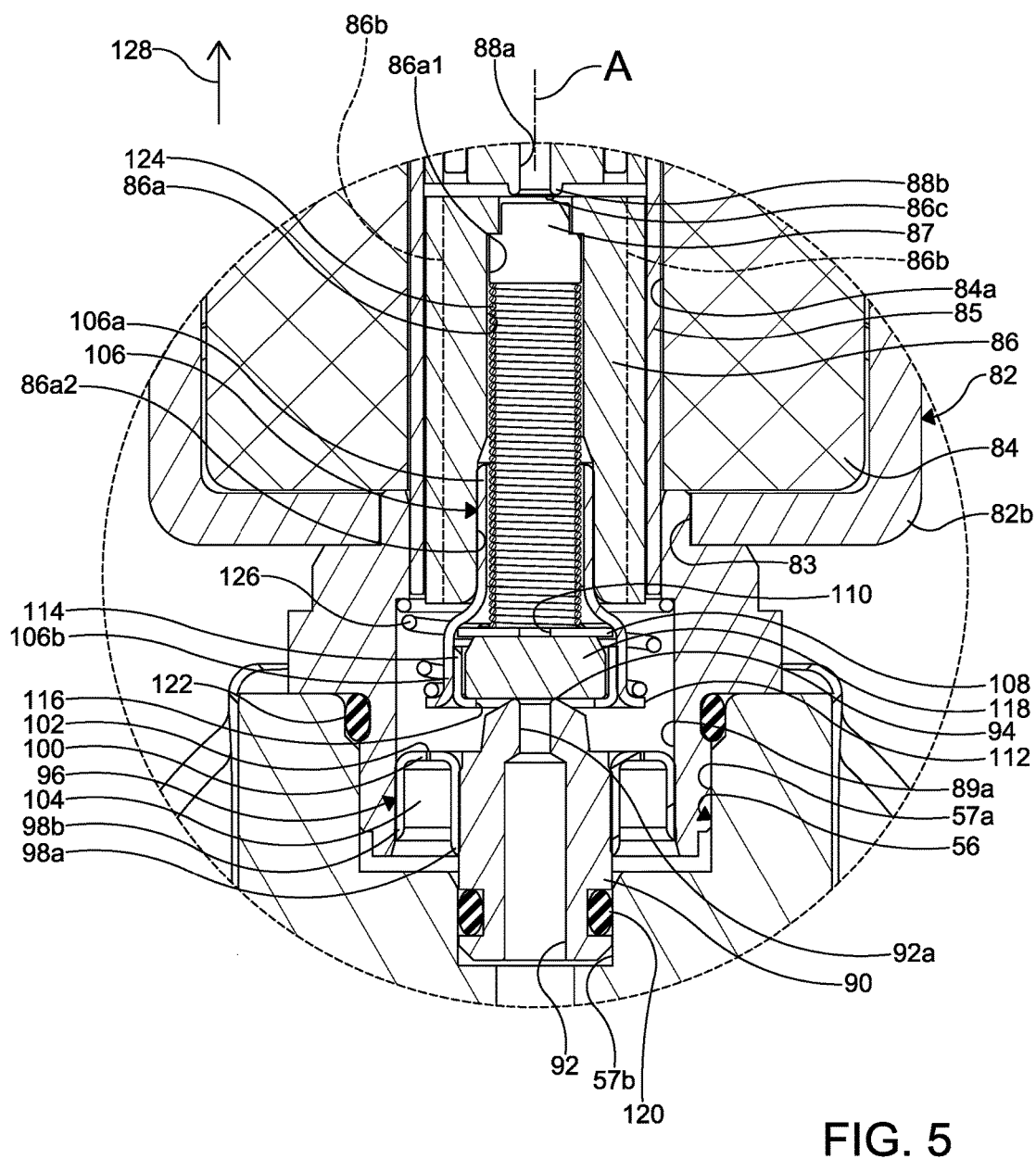
FIG. 5 is an enlarged sectional view of a portion of the pneumatic valve manifold and pneumatic valve illustrated in FIG. 4.

Referring now to FIGS. 4 through 6, the pneumatic valve 80 is shown in a closed position wherein the solenoid of the pneumatic valve 80 is de-energized, the valve closure member 118 is seated on the inlet valve seat 94, and the exhaust valve seat 88b is open. When the pneumatic valve 80 is actuated, i.e., when the solenoid is energized, the pneumatic valve 80 moves to an open position wherein the armature 86 moves in the direction of the arrow 128 (upwardly when viewing FIG. 5), and the valve closure member 118 is moved away from the inlet valve seat 94, thus allowing air from the air intake port 62 to flow through the bore 92 and into the air chamber 89b. The air can then flow through the fluid flow holes 102, the annular outlet valve passageway 104, the discharge passageways 70, and to the clutch assembly 14 of the power take-off unit 10, such as through the passageway 31, described in detail below.

When the the pneumatic valve 80 is again de-energized, the pneumatic valve 80 is returned to the closed position, and pressurized air that may be trapped in the passageway 31 may travel back into the outlet valve passageway 104, the air chamber 89b, the axially extending grooves 86b, a space defined between the armature 86 and into the environment outside of the pneumatic valve manifold 50 and the pneumatic valve 80 through the exhaust bore 88a.

When the pneumatic valve 80 is again actuated moved into an open position, the cap 87 is urged in to contact with the exhaust valve seat 88b, thereby closing the exhaust bore 88a of the exhaust valve port member 88, and preventing air from exiting the pneumatic valve 80 through the exhaust valve port member 88.

Figure 7:
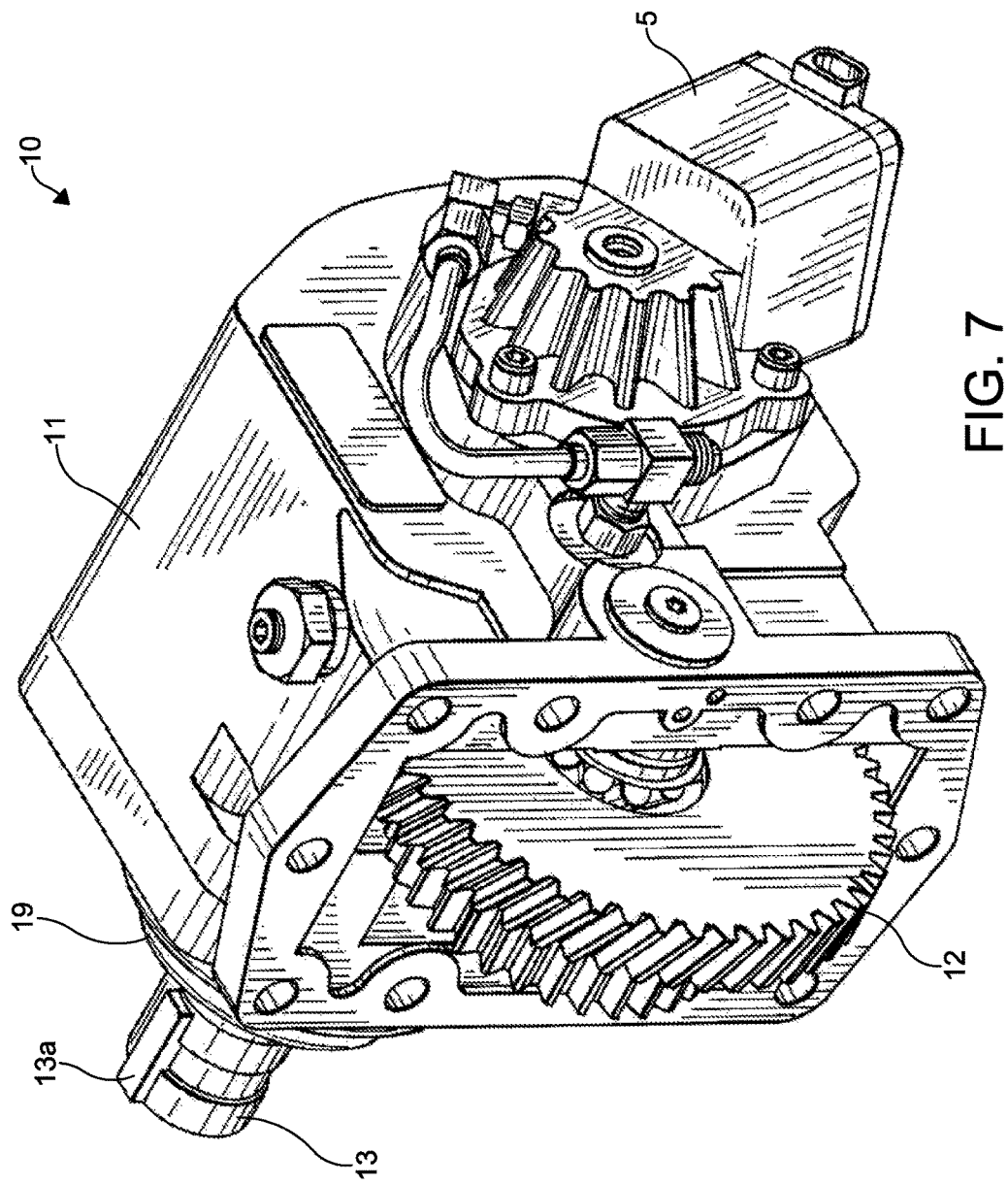
FIG. 7 is a perspective view of a conventional power take-off unit.
Figure 9:
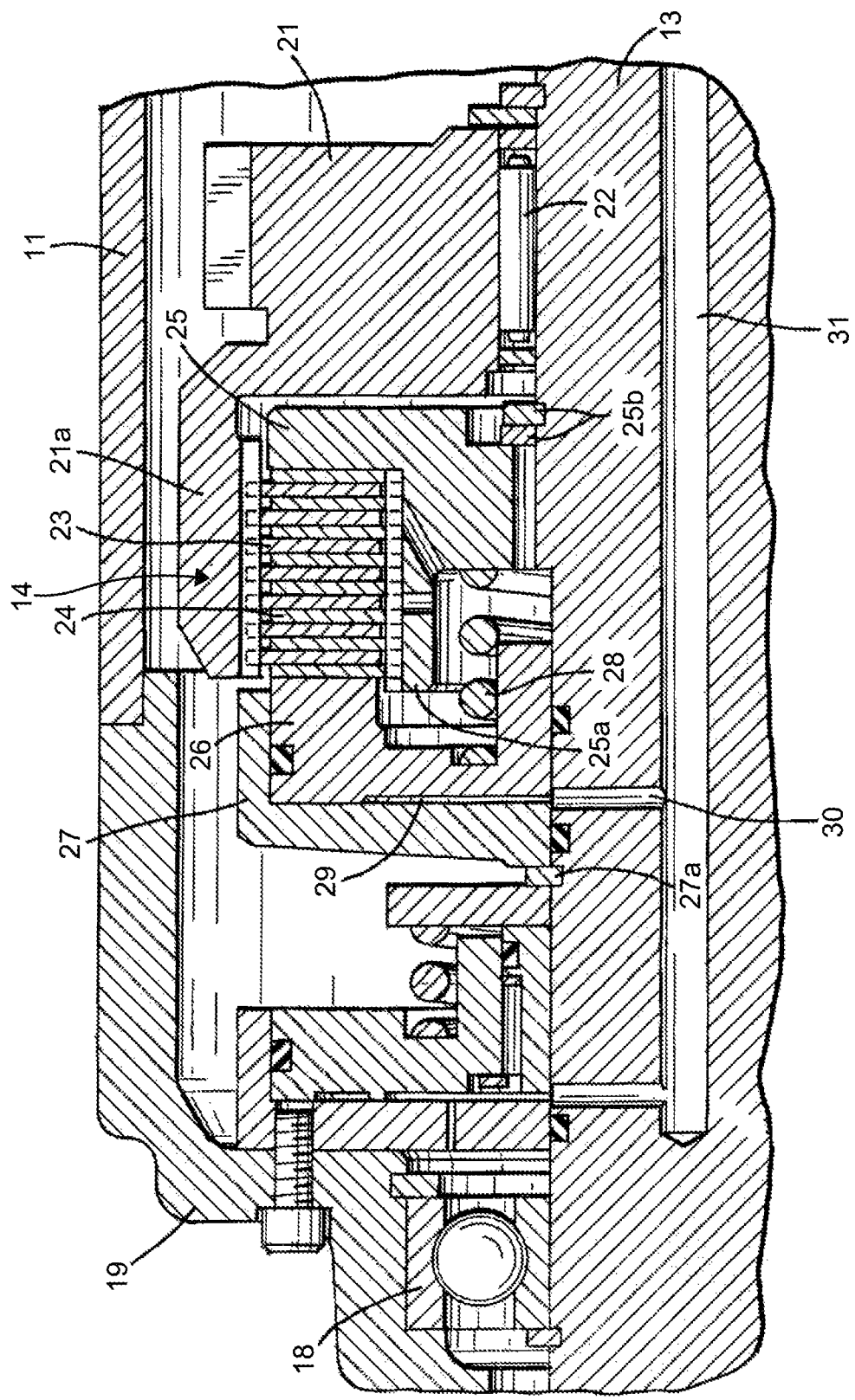
FIG. 9 is an enlarged sectional elevational view of a portion of the power take-off unit illustrated in FIG. 8.

Referring now to FIGS. 7 through 9, the structure of the conventional power take-off unit 10 is shown. The basic structure and mode of operation of the power take-off unit 10 are well known in the art, and only those portions of the power take-off unit 10 which are necessary for a complete understanding of the invention will be described. The power take-off unit 10 includes a rigid housing 11 which contains an input gear 12 and an output shaft 13. The input gear 12 is adapted to be connected to an engine or transmission (not shown) of a vehicle or other source of rotational power so as to be rotatably driven in a conventional manner. The output shaft 13 is adapted to be connected to rotatably driven accessory (not shown), such as a hydraulic pump. The illustrated output shaft 13 is cylindrical in shape and is provided with a conventional key 13a for facilitating a rotatable driving connection with the driven accessory.

Referring now to FIG. 8, the input gear 12 is supported by a pair of tapered roller bearings 15a and 15b for rotation on a non-rotatable idler shaft 16 contained within the housing 11 of the power take-off unit 10. A lubrication passageway 20 is formed through the housing to provide a lubricant to the roller bearings 15a and 15b. The ends of the idler shaft 16 are supported within respective openings 11a formed through the housing 11 of the power take-off unit 10. A first end of the output shaft 13 (the right end when viewing FIG. 8) is rotatably supported by conventional needle bearings 17 provided within an opening 11b formed through the housing 11 of the power take-off unit 10. A second end of the output shaft 13 (the left end when viewing FIG. 8) is rotatably supported by a conventional annular bearing 18 mounted within a bearing cap 19 secured about an open end of the housing 11 of the power take-off unit 10. A conventional hydraulic valve and manifold 5 is mounted to the housing 11 about the first end of the output shaft 13.

The power take-off unit 10 includes a clutch assembly 14 for selectively providing a driving connection between the input gear 12 and the output shaft 13. The clutch assembly 14 includes a drive gear 21 which meshes with the input gear 12. The drive gear 21 is rotatably supported on the output shaft 13 by a plurality of conventional needle bearings 22. The drive gear 21 includes an axially-extending hollow cylindrical portion 21a having a splined inner surface. A plurality of flat annular clutch plates 23 is splined to the inner splined surface of the hollow cylindrical portion 21a of the drive gear 21 for rotation therewith. Thus, the drive gear 21 and the clutch plates 23 are constantly rotatably driven by the input gear 12.

A plurality of annular friction plates 24 is disposed in alternating fashion between the clutch plates 23. The friction plates 24 are splined to an outer splined surface provided on an axially extending cylindrical portion 25a of a clutch gear 25 for rotation therewith. The clutch gear 25 is splined or otherwise secured to the output shaft 13 for rotation therewith. Thus, the friction plates 24, the clutch gear 25, and the output shaft 13 are connected for rotation together as a unit. The clutch gear 25 is restrained from axial movement in one direction (toward the right when viewing FIG. 8) by one or more retaining rings 25b which are mounted on the output shaft 13, for a purpose which will be explained below.

The clutch plates 23 and the friction plates 24 form a portion of the clutch assembly 14 for the power take-off unit 10. An annular clutch piston 26 is provided for selectively causing the clutch plates 23 and the friction plates 24 to frictionally engage one another so as to engage the clutch assembly 14. To accomplish this, the clutch piston 26 is disposed within a hollow cylindrical clutch cylinder 27. The clutch cylinder 27 has a closed end and an opened end. One end of the clutch piston 26 (the left end when viewing FIG. 8) is disposed within the clutch cylinder 27, while the opposite end of the clutch piston 26 (the right end when viewing FIG. 8) extends from the opened end of the clutch cylinder 27 adjacent to the clutch plates 23 and friction plates 24. Both the clutch piston 26 and the clutch cylinder 27 are supported on the output shaft 13. The clutch piston 26 is axially movable along the output shaft 13, but the clutch cylinder 27 is restrained from axial movement in one direction (toward the left when viewing FIG. 8) by one or more retaining rings 27a which are mounted on the output shaft 13, for a purpose which will be explained below.

A coiled clutch spring 28 reacts between the clutch piston 26 and the clutch gear 25. As discussed above, the clutch gear 25 is restrained from axial movement in one direction (toward the right when viewing FIG. 8) by the retaining rings 25b. Thus, the clutch spring 28 urges the clutch piston 26 axially in the opposite direction (toward the left when viewing FIG. 8) toward a disengaged position adjacent to the closed end of the clutch cylinder 27. In the disengaged position, the clutch piston 26 does not engage the clutch plates 23 and the friction plates 24. Thus, the clutch plates 23 and the friction plates 24 do not frictionally engage one another. As a result, the clutch gear 25 is disconnected from the drive gear 21 so as to provide no rotatable driving connection therebetween.

An annular clutch chamber 29 is defined between the clutch piston 26 and the closed end of the clutch cylinder 27. This annular clutch chamber 29 communicates through a first transverse passageway 30 and an axial passageway 31 formed through the output shaft with a source of pressurized air (not shown) via the pneumatic valve manifold 50 and the pneumatic valve 74, described below.

As will be explained in greater detail below, when pressurized air is provided from the source of pressurized air to the annular clutch chamber 29, the clutch piston 26 is moved axially against the urging of the clutch spring 28 from the disengaged position to an engaged position. In the engaged position, the clutch piston 26 compresses the clutch plates 23 and the friction plates 24 together so as to provide a rotatable driving connection therebetween. As a result, the clutch gear 25 is connected to the drive gear 21, and the output shaft 13 is rotatably driven by the input gear 12.

The overall operation of the power take-off unit 10 will now be described. When the engine of the vehicle (not shown) is started, the input gear 12 is driven to rotate. Rotation of the input gear 12 causes rotation of the drive gear 21 to freely rotate around the output shaft 13. Assuming that the source of pressurized air has not been turned on, there is no pressurized air in the passageways 30 and 31. Therefore, the clutch assembly 14 is maintained in its normally disengaged position under the influence of the clutch spring 28. As mentioned above, the clutch spring 28 moves the clutch piston 26 within the clutch cylinder 27 (toward the left when viewing FIG. 8) and away from the clutch plates 23 and friction plates 24. Thus, the clutch plates 23 and 24 do not frictionally engage one another, and the output shaft 13 is not rotatably driven by the input gear 12.

When it is desired to engage the power take-off unit 10 to operate a driven device, the source of pressurized air (not shown) is actuated to supply pressurized air in the passageways 30 and 31. As described above, the source of pressurized air may be from the vehicle air brakes. Alternatively, the source of pressurized air may be any desired device, such as an auxiliary compressor. The pressurized air is routed from the source of pressurized air through the air intake port 62, through the pneumatic valve connection port 56, and the pneumatic valve 74 into the passageways 30 and 31 via the passageways 70. In the illustrated embodiment, a minimum air pressure of about 70 psi is required to operate the clutch assembly 14, although the clutch assembly 14 may be configured to be operative at lower or greater than about 70 psi. Preferably, air delivered into the passageway 31 has a pressure within the range of from about 90 psi to about 120 psi.

When the pressurized air enters the passageways 30 and 31, the air pressure within the annular clutch chamber 29 overcomes the force exerted by the clutch spring 28 and moves the clutch piston 26 axially into engagement with the friction plates 24 and clutch plates 23. Thus, the clutch piston 26 functions as a pneumatic actuator for the clutch assembly 14. As a result of this frictional engagement, the clutch gear 25 and the output shaft 13 are caused to rotate with the drive gear 21.

As shown in FIG. 8, the pneumatic valve manifold 50 and the pneumatic valve 80 may be attached to the housing 11 about the first end of the output shaft 13.

Figure 10:
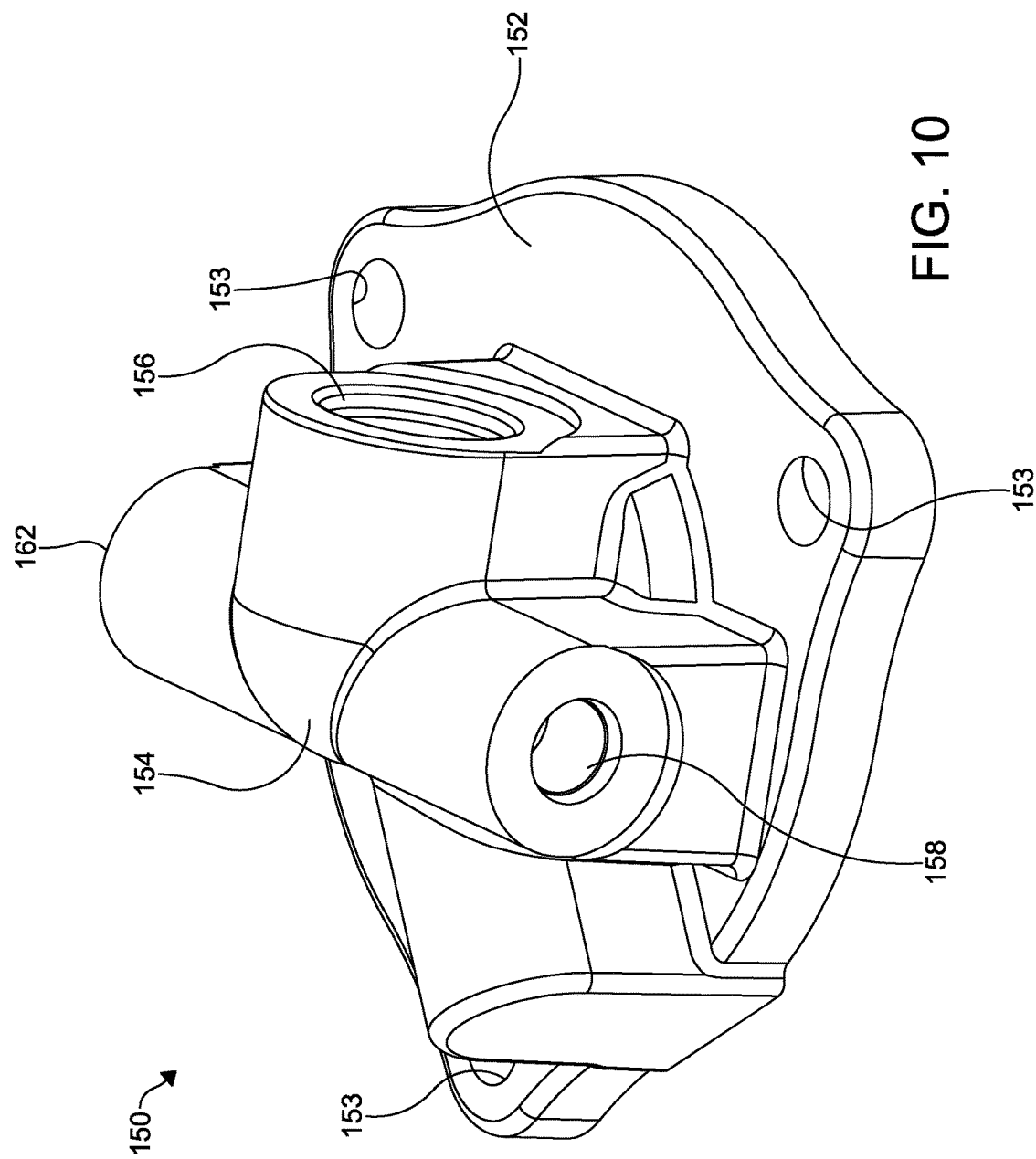
FIG. 10 is a perspective view of a second embodiment of an improved pneumatic valve manifold according to this invention.

A second embodiment of the improved pneumatic valve manifold according to this invention is shown at 150 in FIG. 10. The pneumatic valve manifold 150 is substantially similar to the pneumatic valve manifold 50 and is configured for attachment to a power take-off unit, such as the power take-off unit 10. The pneumatic valve manifold 150 includes the mounting flange 152 having a plurality of fastener apertures 153 formed therethrough, and the manifold body 154. The manifold body 154 includes a plurality of ports formed therein. In the illustrated embodiment, the manifold body 154 includes the pneumatic valve connection port 156, the pressure switch port 158, and the air intake port 162, the structure and function of which are the same as in the pneumatic valve manifold 50. The pneumatic valve manifold 150 however, does not include a lubrication port 60.

The pneumatic valve manifold 150 is useful for example, in vehicle configurations wherein additional lubrication of the power take-off unit 10 is not required.

Figure 11:
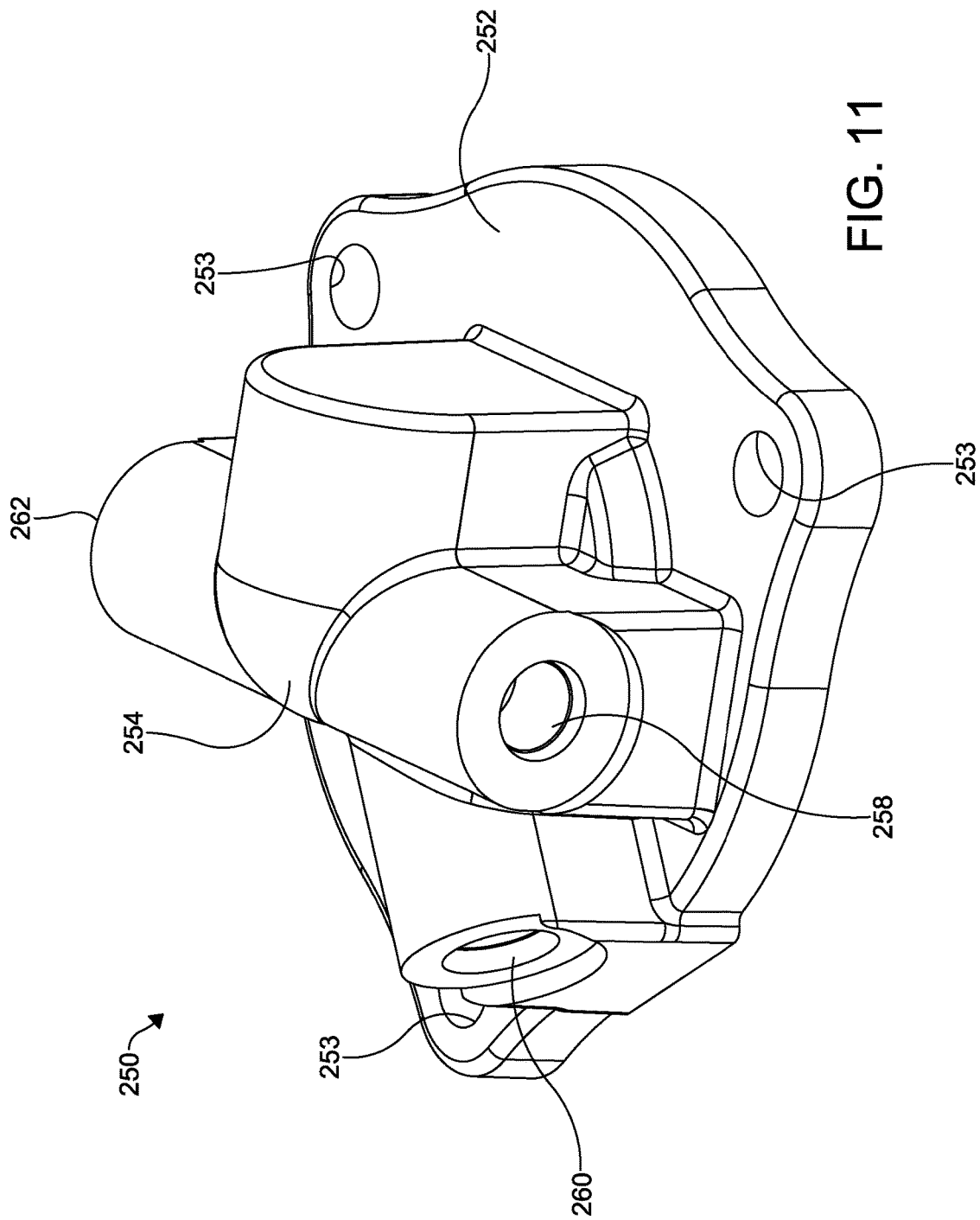
FIG. 11 is a perspective view of a third embodiment of an improved pneumatic valve manifold according to this invention.

A third embodiment of the improved pneumatic valve manifold according to this invention is shown at 250 in FIG. 11. The pneumatic valve manifold 250 is substantially similar to the pneumatic valve manifold 50 and is configured for attachment to a power take-off unit, such as the power take-off unit 10. The pneumatic valve manifold 250 includes the mounting flange 252 having a plurality of fastener apertures 253 formed therethrough, and the manifold body 254. The manifold body 254 includes a plurality of ports formed therein. In the illustrated embodiment, the manifold body 254 includes the pressure switch port 258, the air intake port 262, and the lubrication port 260, the structure and function of which are the same as in the pneumatic valve manifold 50. The pneumatic valve manifold 250 however, does not include a pneumatic valve connection port.

The pneumatic valve manifold 250 is useful for example, in vehicle configurations wherein a pneumatic valve, such as the pneumatic valve 80, is mounted remotely from the pneumatic valve manifold 250, but is in fluid communication between the source of pressurized air and the clutch assembly 14.

Figure 12:
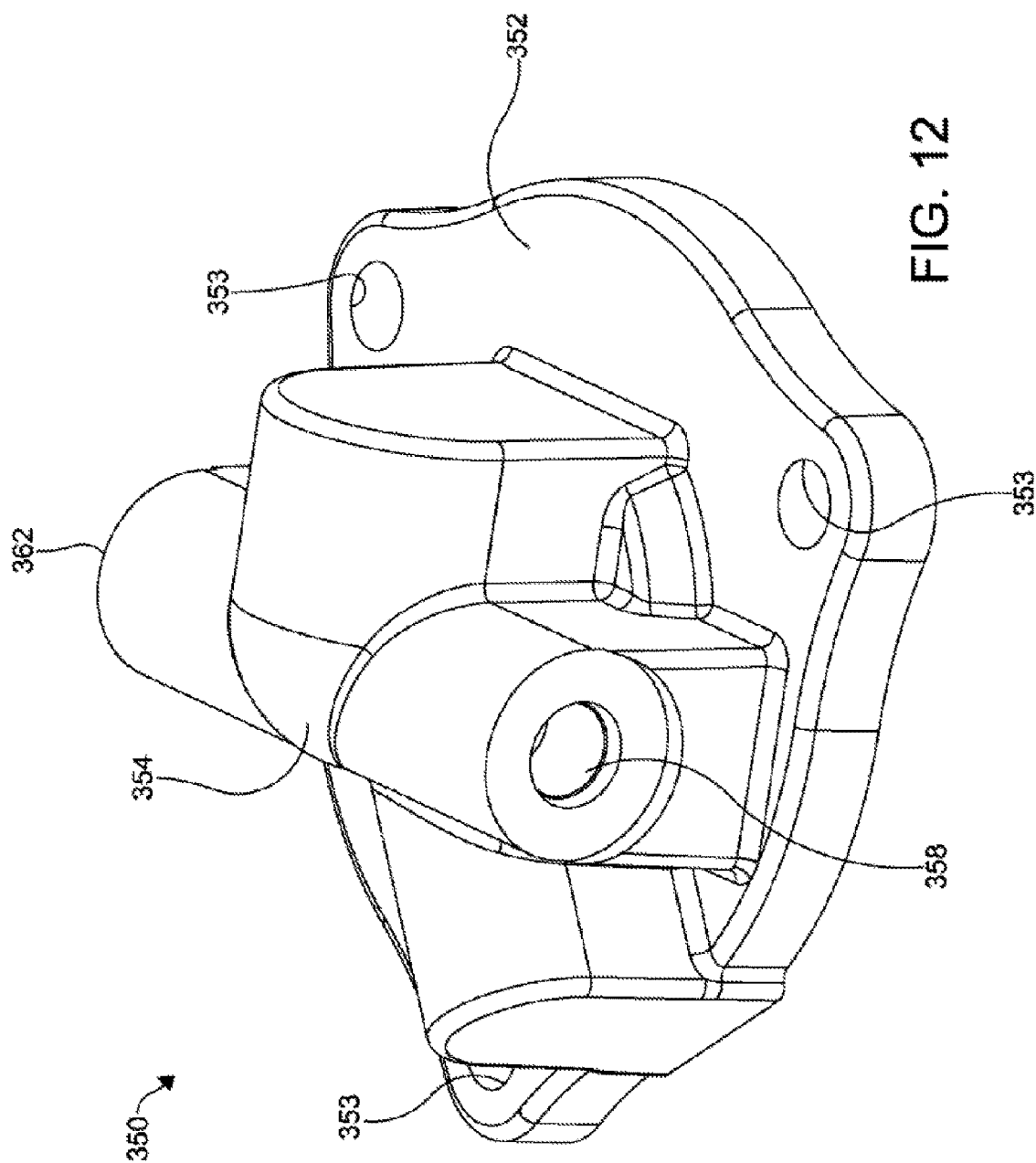
FIG. 12 is a perspective view of a fourth embodiment of an improved pneumatic valve manifold according to this invention.

A fourth embodiment of the improved pneumatic valve manifold according to this invention is shown at 350 in FIG. 12. The pneumatic valve manifold 350 is substantially similar to the pneumatic valve manifold 50 and is configured for attachment to a power take-off unit, such as the power take-off unit 10. The pneumatic valve manifold 350 includes the mounting flange 352 having a plurality of fastener apertures 353 formed therethrough, and the manifold body 354. The manifold body 354 includes a plurality of ports formed therein. In the illustrated embodiment, the manifold body 354 includes the pressure switch port 358, and the air intake port 362, the structure and function of which are the same as in the pneumatic valve manifold 50. The pneumatic valve manifold 350 however, does not include a pneumatic valve connection port or a lubrication port.

The pneumatic valve manifold 350 is useful for example, in vehicle configurations wherein a pneumatic valve, such as the pneumatic valve 80, is mounted remotely from the pneumatic valve manifold 250, but is in fluid communication between the source of pressurized air and the clutch assembly 14, and wherein additional lubrication of the power take-off unit 10 is not required.

Advantageously, the improved pneumatic valve manifolds 50, 150, 250, and 350 described herein are attached to the power take-off unit 10, thus reducing the number of parts, and simplifying the installation of the parts, required for the vehicle pneumatic system used to operate the power take-off unit 10.

The principle and mode of operation of the invention have been described in its preferred embodiments. However, it should be noted that the invention described herein may be practiced otherwise than as specifically illustrated and described without departing from its scope.

What is claimed is:

1. A power take-off unit comprising:
   a housing;
   an input mechanism mounted at least partially within the housing and configured for attachment to a source of rotational energy;
   an output mechanism mounted within the housing and configured for attachment to a driven accessory, the output mechanism having a passageway extending therethrough;
   a clutch assembly that is responsive to pressurized air in the passageway through the output mechanism for connecting the output mechanism to the input mechanism; and
   a pneumatic valve manifold attached to the housing and including an air intake port that is configured for attachment to a source of pressurized air, a pneumatic valve that communicates with air intake port, and a discharge passageway that communicates with both the pneumatic valve and the passageway through the output mechanism, the pneumatic valve being operable to selectively permit pressurized air to pass from the source of pressurized air through the air intake port, the pneumatic valve, the discharge passageway, and the passageway through the output mechanism to the clutch assembly.

2. The power take-off unit according to claim 1, wherein the pneumatic valve manifold is attached to the housing about an end of the input mechanism.

3. The power take-off unit according to claim 1, wherein the pneumatic valve manifold includes a pressure switch port that communicates with the passageway through the output mechanism, formed therein, and wherein a pressure switch is provided in the pressure switch port.

4. The power take-off unit according to claim 3, wherein the pneumatic valve manifold further includes a lubrication port formed therein, the lubrication port in fluid communication between a source of fluid and the power take-off unit and configured to provide fluid from the source of fluid to one of lubricate and cool the power take-off unit.

5. The power take-off unit according to claim 4, wherein the pneumatic valve manifold further includes a pneumatic valve connection port formed therein.

6. The power take-off unit according to claim 5, wherein the air intake port is in fluid communication with the pneumatic valve connection port.

7. The power take-off unit according to claim 6, further including a pneumatic valve attached within the pneumatic valve connection port of the pneumatic valve manifold and in fluid communication between a source of pressurized air and the clutch assembly.

8. The power take-off unit according to claim 3, wherein the pneumatic valve manifold further includes a pneumatic valve connection port formed therein.

9. The power take-off unit according to claim 8, wherein the air intake port is in fluid communication with the pneumatic valve connection port.

10. The power take-off unit according to claim 9, further including a pneumatic valve attached within the pneumatic valve connection port of the pneumatic valve manifold and in fluid communication between a source of pressurized air and the clutch assembly.

11. A power take-off unit comprising:
a housing;
an input mechanism mounted at least partially within the housing and configured for attachment to a source of rotational energy;
an output mechanism configured for attachment to a driven accessory;
a clutch assembly configured to selectively connect the output mechanism to the input mechanism; and
a pneumatic valve manifold including a manifold body having an air intake port and a pressure switch port formed therein, the pneumatic valve manifold attached to the housing about an end of the input mechanism and configured to provide pressurized air to the clutch assembly.

12. The power take-off unit according to claim 11, wherein the pneumatic valve manifold further includes a lubrication port formed therein, the lubrication port in fluid communication between a source of fluid and the power take-off unit and configured to provide fluid from the source of fluid to one of lubricate and cool the power take-off unit.

13. The power take-off unit according to claim 12, wherein the pneumatic valve manifold further includes: a pneumatic valve connection port formed therein and in fluid communication with the air intake port; and a pneumatic valve attached within the pneumatic valve connection port and in fluid communication between a source of pressurized air and the clutch assembly.

14. A power take-off unit comprising:
a housing;
an input mechanism mounted at least partially within the housing and configured for attachment to a source of rotational energy;
an output mechanism configured for attachment to a driven accessory;
a clutch assembly configured to selectively connect the output mechanism to the input mechanism; and
a pneumatic valve manifold including a manifold body having an air intake port, a pressure switch port, and a pneumatic valve connection port formed therein, the pneumatic valve manifold attached to the housing about an end of the input mechanism and configured to provide pressurized air to the clutch assembly.

15. The power take-off unit according to claim 14, wherein the pneumatic valve manifold further includes a lubrication port formed therein, the lubrication port in fluid communication between a source of fluid and the power take-off unit and configured to provide fluid from the source of fluid to one of lubricate and cool the power take-off unit.

16. The power take-off unit according to claim 15, wherein the air intake port is in fluid communication with the pneumatic valve connection port, and further including a pneumatic valve attached within the pneumatic valve connection port of the pneumatic valve manifold and in fluid communication between a source of pressurized air and the clutch assembly.

* * * * *